J. E. NORMAN.
GIN SAW FILER AND GUMMER.
APPLICATION FILED JULY 21, 1917.

1,272,343.

Patented July 9, 1918.
3 SHEETS—SHEET 1.

INVENTOR
James E. Norman

BY:
Hardway & Carter
ATTORNEYS.

J. E. NORMAN.
GIN SAW FILER AND GUMMER.
APPLICATION FILED JULY 21, 1917.

1,272,343.

Patented July 9, 1918.
3 SHEETS—SHEET 2.

INVENTOR
James E. Norman
BY
Hardway Cartny
ATTORNEYS.

J. E. NORMAN.
GIN SAW FILER AND GUMMER.
APPLICATION FILED JULY 21, 1917.
1,272,343.
Patented July 9, 1918.
3 SHEETS—SHEET 3.
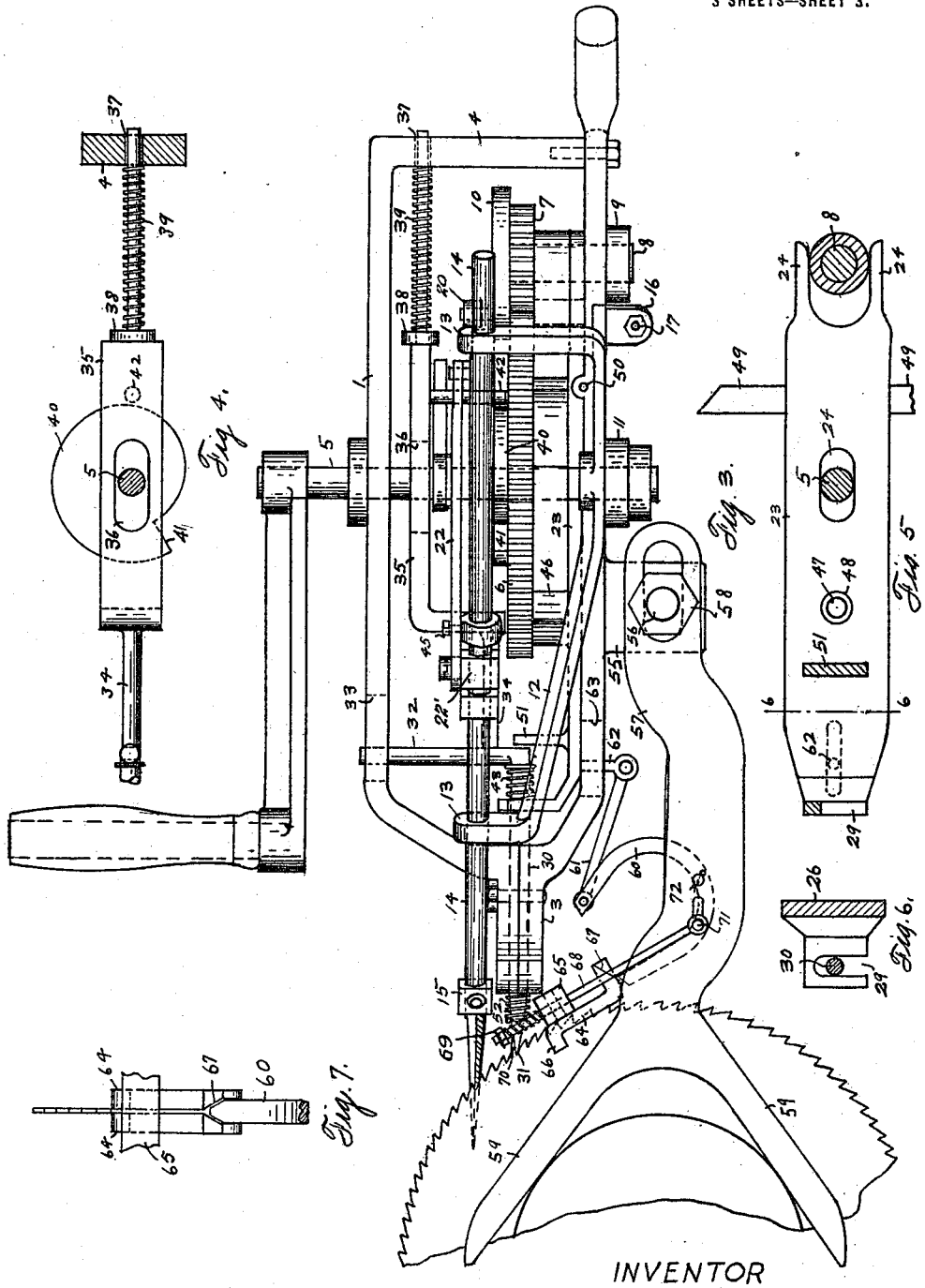
INVENTOR
James E. Norman
BY Hardway & Cathy
ATTORNEYS.

UNITED STATES PATENT OFFICE.

JAMES E. NORMAN, OF THORP SPRING, TEXAS.

GIN-SAW FILER AND GUMMER.

1,272,343.  Specification of Letters Patent.  Patented July 9, 1918.

Application filed July 21, 1917. Serial No. 182,070.

*To all whom it may concern:*

Be it known that I, JAMES E. NORMAN, a citizen of the United States, residing at Thorp Spring, in the county of Hood and State of Texas, have invented certain new and useful Improvements in Gin-Saw Filers and Gummers, of which the following is a specification.

This invention relates to new and useful improvements in a gin saw filer and gummer.

The object of the invention is to provide a device of the character described that will sharpen and gum the teeth of gin saws.

Another object of the invention resides in the provision of a device of the character described having reciprocating files and means whereby the files are partially rotated in each direction while being reciprocated, so as to form a sharp conical shaped tooth.

A further feature of the invention resides in the provision of clamping jaws which clamp the sides of the saw to be sharpened and feeds the saw to the files and the gummer.

A further feature of the invention resides in the provision of a chisel-like gummer which engages between the saw teeth and locks the saw to prevent it from gradually turning while the files are operating on a tooth, in combination with an automatic trip hammer arranged to strike the chisel, causing it to swage out the throat between the teeth and to straighten up any teeth that may be bent or deformed.

A still further feature of the invention resides in the provision of a means for withdrawing the chisel so that it will clear the saw teeth to permit the rotation of the saw, as well as a means operating simultaneously to spread the files causing them to clear the saw teeth when the saw is rotated, to bring the next succeeding tooth into position for operation.

With the above and other objects in view, the invention has particular relation to certain novel features of construction, operation and arrangement of parts, an example of which is given in this specification and illustrated in the accompanying drawings, wherein:—

Fig. 3 is a side elevation of the device,

Fig. 4 shows a plan view of the trip hammer and the means for actuating the same.

Fig. 5 shows a fragmentary plan view of the chisel-actuating bar.

Fig. 6 shows a transverse sectional view thereof, taken on the line 6—6 of Fig. 5, and Fig. 7 shows a fragmentary plan view of the saw feed mechanism.

Figure 1:
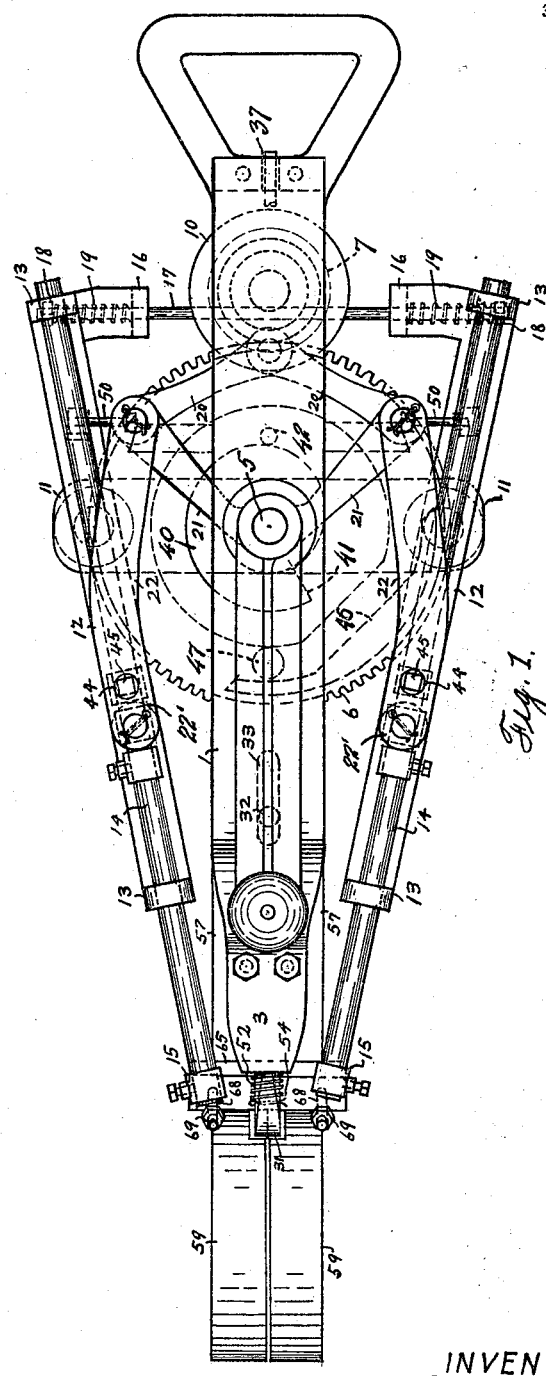
Figure 1 is a top plan view of the machine.
Figure 2:
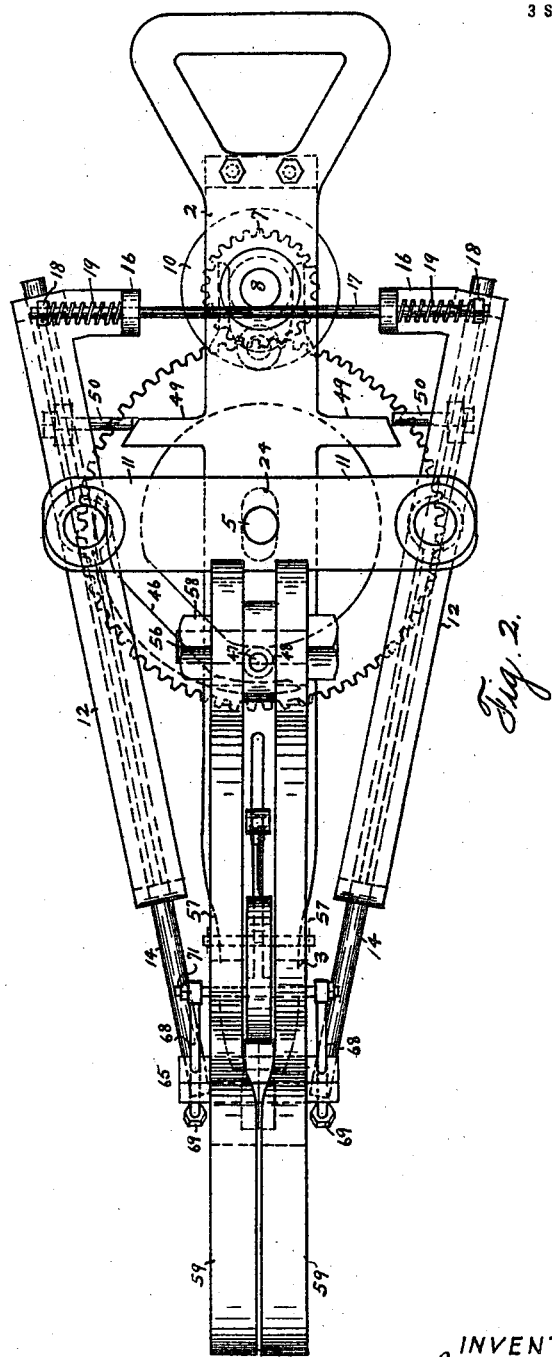
Fig. 2 is a bottom plan view.

Referring now more particularly to the drawings wherein like numerals of reference designate similar parts in each of the figures, the numerals 1 and 2 refer, respectively, to the top and bottom members of the framework which are spaced apart, but whose forward ends converge and are secured together forming a bearing 3. The opposite ends of the members 1 and 2 are fixed relative to each other by the bridge 4, as shown in Fig. 3. Rotatable in alined bearings in the frame members 1 and 2 is the shaft 5 which is rotated in any suitable manner, preferably by means of a crank, although this shaft may be rotated by means of a motor if desired. Fixed upon the shaft 5 between the frame members 1 and 2, is a spur gear wheel 6, which is in mesh with and rotates a corresponding gear wheel 7 fixed upon the short shaft 8 which is rotatable in a suitable bearing 9 carried by the rear end of the frame member 2. Formed integrally with the gear wheel 7 is a disk 10 provided for the purpose to be hereinafter stated. Formed integrally with the member 2 are the oppositely extending arms 11, 11, upon the free ends of which are pivoted the file supports 12, 12, whose ends are upwardly turned and formed into bearings 13, 13, through which the file rods 14, 14, respectively, reciprocate. These file rods converge forwardly and their forward ends are provided with clamps 15, 15, which receive and secure the files to the file rods, said files crossing each other so as to operate upon opposite sides of the tooth. The rear ends of the file supports are provided with bearing members 16, 16, through which the rod 17 extends. The respective ends of said rod are provided with nuts 18, 18, and surrounding the rod and interposed between said nuts and the corresponding bearings 16 are the coil springs 19, 19 which form yieldable seats for the file supports and the tension of which may be regulated by the nuts 18. A pair of links 20, 20 are pivoted at one end, eccentrically, to the disk 10 and another pair of links 21, 21, having bearings on the main gear wheel shaft 5, the free ends of the corresponding links 20 and 21 being pivoted together and being also pivoted to pitmen 22, 22, at one end. These pitmen are pivoted at their other ends to bearing blocks 22' which are fastened to the corresponding file rods and as the disk 10 is rotated, they operate to reciprocate said file rods and the corresponding files carried thereby. Slidably mounted upon the frame member 2 is the chisel actuating bar 23 having an oblong slot 24 to receive the shaft 5 and whose rear end is bifurcated, forming the fingers 24, 24, which embrace the shaft 8. The forward end of this bar is upturned and provided with an open bearing 29, alined with the bearing 3 and a chisel 30 is slidable through said bearings, the outer end 31 of said chisel being widened and formed into a blade and the opposite end thereof being provided with a guide finger 32 extending upwardly and playing through the slot 33 in the frame member 1. The numeral 34 refers to a trip hammer, a section 35 of which is widened and provided with a slot 36 to receive the shaft 5. The outer end of this hammer has a bearing 37 in the bridge 4 and carries an annular shoulder 38 and interposed between this shoulder and the bridge 4, and surrounding the hammer is the coil spring 39. Fixed upon the shaft 5 is a cam 40, the periphery of which has the abrupt off set 41. The periphery of this cam plays against a stud 42 projecting out from the hammer and as the cam rotates, gradually withdraws the hammer from the inner end of the chisel, compressing the spring 39 until said off set is reached and then releases the hammer to said spring, the pressure of which causes the hammer to suddenly strike the inner end of the chisel and drive the blade of the chisel into the opposing throat between the teeth, causing the chisel to cut out said throat, the chisel thus operating to swage out a square throat between the teeth removing the sharp edges in the throat caused by previous filings. It is necessary that this sharp edge in the throat between the teeth be removed, because if left, the cotton fiber will be cut, in ginning, rather than pulled from the seeds and much lint cotton would thus be left to pass with the seeds and the staple injured. The chisel also operates to straighten up the teeth in case they have become bent over and deformed. Interposed between the upturned end of the chisel actuating bar 23 and the finger 32 and surrounding the inner end of the chisel is the coil spring 43 which acts as a cushion when the hammer strikes the chisel, to absorb the shock of the hammer so that the stroke thereof will be sustained entirely by the chisel and will not be transmitted through it either to the chisel actuating bar or the frame. The gear wheels 6 and 7 are of such relative sizes that four strokes will be imparted to each file for each single stroke of the hammer against the chisel thus giving the files time to sharpen the ends of the teeth before the corresponding throat is swaged out and the saw partially turned for operation upon the next succeeding tooth. Each of the pitmen 22 is provided with a bearing 44 and through these bearings the set bolts 45, 45, pass loosely and are threaded into the corresponding file rods 14, 14. It is obvious that as the pitmen reciprocate, a certain amount of lateral movement will be imparted to them through the corresponding links 20 and 21, caused by the rotation of the disk 10, and this lateral movement of said pitmen will cause a corresponding partial rotation in each direction of the file rods and files and the files will thus operate around the point of the tooth being operated upon and reduce said point to a conical shape. The under face of the gear wheel 6 is provided with a depending cam shaped rim 46 and upstanding from the chisel actuating bar is a stud 47 carrying an anti-friction roller 48 with which said rim engages and withdraws the bar and releases the chisel from the opposing throat so as it will clear the teeth and permit the saw to rotate. The chisel actuating bar is provided with laterally extending arms 49, 49, whose outer ends are rearwardly beveled, and threaded through the file supports are the set bolts 50, 50, whose inner ends rest against the sloping outer ends of said arms and as the bar 23 is withdrawn, the arms 49 acting against the inner ends of the bolts 50 cause the rear ends of the file supports to spread apart causing the files at their other ends to spread correspondingly and clear the teeth to permit the saw to rotate. As soon as the roller 48 has cleared the cam shaped flange 46, the pressure of the bolts 50 against the sloping ends of the arms 49 caused by the tension of the springs 19, 19, will move the chisel actuating bar forwardly and carry the lug 51, upstanding from said bar, against the inner end of the chisel forcing said chisel between the next succeeding opposing throat and holding it there to lock the saw against turning while the files are in operation. Surrounding the outer end of the chisel is a coil spring 52 which is interposed between the outer end of the bearing 3 and the cotter key 54, passing through said chisel, which holds the chisel firmly in the throat but permits it to yield in case its edge should come against a bent over tooth or other obstruction which might prevent it from completely seating, thus preventing the breakage of the chisel or tooth. Projecting out from the frame member 2 is a bearing 55 and clamped upon each side of said bearing, by means of the bolt 56 are the supports 57, 57. The bolt 56 passes through the orifice in the bearing 55 and through alined oblong slots in the supports 57 said slots permitting the adjustment of said supports and the supports being secured in fixed position by means of the lock nut 58 which is threaded on said bolt. These supports are spaced apart a sufficient distance to receive a gin saw between them and their free ends are bifurcated, forming the fingers 59, 59, which fit between the saws and rest on the mandrel carrying said saws. Pivoted between the supports 57 is a U-shaped lever 60. One arm of this lever is pivoted to one end of the link 61 and the other end of this link is pivoted to an arm 62 which is integral with the chisel actuating bar 23 and projects down through an oblong slot 63 in the frame member 2. When the chisel actuating bar moves rearwardly, as hereinbefore explained, to carry the chisel clear of the saw teeth, it will operate through the link 61 to exert a rearward pull on the lever 60 carrying the free end of the other arm thereof between the outwardly diverging ends of the clamping jaws 64 and causing the other ends of said jaws to clamp the saw. These jaws are pivoted to a block 65 and are spaced apart to receive the saw between them. Their forward ends are formed into clamps 66, 66, and their other ends are turned at right angles, the inner sides of said overturned portions being outwardly beveled as at 67 to receive the free end of the corresponding arm of the lever 60. The block 65 is slidably mounted upon a track formed of the rods 68, 68, which pass through suitable bearings in said block and the outer ends of these rods have the nuts 69, 69 secured thereon and interposed between these nuts and the block and surrounding said rods are the coil springs 70. The opposite ends of said rods are flattened and provided with orifices to receive a bolt 71 which passes through said orifices and through oblong slots 72 in the supports 57. One end of this bolt is provided with an enlarged head and the other end is threaded to receive a nut by means of which the rods 68 may be clamped in position and the oblong slots 72 are provided to permit the adjustment thereof relative to the supports 57. When a pull is exerted through the link 61 the free end of the corresponding arm of the lever 60 will first move between the outwardly beveled ends of the jaws 64 causing them to clamp the saw and a further pull will force the block 65 and jaws to move upwardly on the rod 68 thus causing a partial rotation of the saw and bringing the next succeeding tooth into position for operation on the part of the files. When the chisel actuating bar 23 is released as hereinbefore explained and moves forwardly, the end of the lever 60 will be released from between said jaws, thus releasing the clamps from the saw and the pressure of the springs 70 will restore the block 65 to its original position.

The operation of the device is as follows: It is first applied to the saw, the fingers 59 resting upon the mandrel and the saw to be operated upon, resting between the supports 57 and coming in between the clamps 66. The crank is now rotated causing a rotation of the gear wheel 6 and through it a rotation of the gear wheel 7 and the disk 10, thus causing a reciprocation of the files through the links 20 and 21 as well as a partial rotation thereof in each direction through the set bolts 44. Meanwhile, the chisel is resting in the opposing throat to hold the saw against rotation. A rotation of the shaft 5 causes the cam 40 to also rotate, thus gradually withdrawing the hammer as explained, until the stud 42 clears the abrupt offset 41 and the spring 39 will then cause the hammer 34 to suddenly strike the inner end of the chisel, thus swaging out said throat in which the chisel rests and straightening up the tooth above the chisel. The cam shaped flange 46 then engages in front of the stud 47 and causes a withdrawal of the chisel actuating bar 23, withdrawing the chisel from the throat and spreading the files clear of the saw teeth as hereinbefore explained. This rearward movement of the chisel actuating bar operates through the link 61 and the lever 60 to cause the clamps 66 to clamp the saw on each side and then partially rotate it, bringing the next succeeding tooth in position to be operated upon by the files and the next succeeding throat in position to receive the chisel and as soon as the flange 46 has cleared said stud 47, the inward pressure of the set screws 50, against the sloping outer ends of the arms 49, causes a forward movement of the chisel bar and carries the chisel into said throat and simultaneously the pressure of the springs 19 against the file supports, carries the files against the tooth to be operated upon.

What I claim is:

1. A saw filer and gummer including a reciprocating file, a chisel-like gummer arranged to engage between the saw teeth successively to secure the saw against rotation while being operated on by the file, and means arranged to impinge against the gummer at predetermined intervals to swage out the throats between the teeth.

2. A saw filer and gummer including a reciprocating file, a chisel-like gummer arranged to engage between the saw teeth to secure the saw against rotation while being operated on by the file, and means for withdrawing the gummer from between the teeth to permit the rotation of the saw.

3. A saw filer and gummer including a reciprocating file, a chisel-like gummer arranged to normally project between the saw teeth and a hammer provided to strike the gummer while between the teeth to swage out and gum the throat between said teeth.

4. In a saw filer and gummer, a chisel-like gummer whose operative end normally rests in the throat between two teeth of the saw, a hammer having a yieldable member resisting against the same, means for withdrawing said hammer to overcome the resistance of said yieldable member, said means being formed to permit the sudden release of the hammer whereby the yieldable member operates to cause said hammer to suddenly strike the opposing end of the gummer.

5. A saw filer and gummer including a pair of reciprocating files, a chisel-like gummer whose operative end normally rests in the throat between two teeth of the saw, a hammer having a yieldable member resisting against the same, means gradually withdrawing the hammer from the gummer, overcoming the resistance of said yieldable means, then suddenly releasing said hammer to the operation of said member, whereby the hammer is caused to suddenly strike the gummer.

6. A saw filer and gummer including a pair of reciprocating files, means for reciprocating the same, a chisel-like gummer arranged to project into the throat between two of the saw teeth to secure the saw against rotation while being operated on by the files.

7. A saw filer and gummer including a pair of reciprocating files, a chisel-like gummer arranged to engage between the saw teeth to secure the saw against rotation while being operated on by the files, and means for withdrawing the gummer and files simultaneously from engagement with the teeth to permit the rotation of the saw.

8. A saw filer and gummer including a pair of reciprocating files, a chisel-like gummer arranged to normally engage between the saw teeth to secure the saw against rotation while being operated on by the files, means for withdrawing the gummer from engagement between said teeth, said means operating against the file supports to simultaneously release the files from engagement with the teeth and to permit the rotation of the saw.

9. A saw filer and gummer including a pair of reciprocating files, a gummer arranged to engage between the saw teeth to secure the saw against rotation, means for withdrawing the gummer and files from engagement with the teeth, means for imparting a partial rotation to the saw simultaneously with the withdrawal of said gummer and files to bring the next succeeding throat and tooth into operative position relative to the gummer and files, respectively.

10. A saw filer and gummer including a pair of reciprocating files, a gummer arranged to engage between the saw teeth to secure the saw against rotation, means for withdrawing the gummer and files from engagement with the teeth, means imparting a partial rotation to the saw simultaneously with the withdrawal of said gummer and files to bring the next succeeding throat and tooth in operative position relative to the gummer and files, respectively, a hammer arranged to strike the opposing end of the gummer, thereby causing the gummer to swage out the throat into which it projects.

11. A saw filer and gummer including a pair of reciprocating files, means for imparting an oscillatory movement to the files during the reciprocating thereof, and a chisel like gummer arranged to operate between the saw teeth, successively, to swage out the throats between said teeth.

12. A saw filer and gummer including a pair of reciprocating files, means for reciprocating the same, said means being movable laterally relative to the reciprocatory movement of the files, said means being also operatively connected with the files to impart an oscillatory movement thereto during the reciprocation of the files, and a chisel like gummer arranged to operate between the saw teeth, successively, to swage out the throats between the teeth.

13. A saw filer and gummer including a pair of reciprocating files, means for holding said files yieldingly against the tooth being operated on, means for adjusting the tension of said yieldable means, means for reciprocating the files and a gummer temporarily engaging between the teeth of the saw successively to secure the saw against rotation, while a tooth is being operated on.

14. In a device of the character described, a feed mechanism which is adapted to engage the saw from opposite sides and which alternately clamps and releases the saw and imparts successive partial rotations thereto.

15. A saw filer and gummer including a pair of reciprocating files, means for actuating the same, and a feed mechanism which clamps the saw from opposite sides and imparts successive partial rotations thereto to bring the saw teeth successively into operative position relative to the files.

16. A saw filer and gummer including a pair of reciprocating files, a chisel-like gummer arranged to engage between the saw teeth to secure the saw against rotation, a feed mechanism which clamps the saw and imparts successive partial rotations thereto, to bring the saw teeth successively into position to be operated upon by the files and gummer, means for withdrawing the files and gummer from operative connection with the saw teeth, said means also actuating the feeder to partially rotate the saw when the files and gummer have been withdrawn from operative connection therewith.

17. A saw filer and gummer including a pair of reciprocating files, a chisel-like gummer arranged to engage between the saw teeth to secure the saw against rotation, a hammer, means for withdrawing the hammer from the gummer and then releasing the hammer, a yieldable member operating upon the release thereof to cause it to strike said chisel and swage out the throat between the teeth into which the gummer projects, a feed mechanism which clamps the saw and imparts successive partial rotations thereto, to bring the saw teeth successively into position to be operated upon by the files and gummer, means for withdrawing the files and gummer from operative connection with the saw teeth, said means also actuating the feeder to partially rotate the saw when the files and gummer have been withdrawn from operative connection therewith.

18. In a saw filer and gummer, a feed mechanism including a block, yieldable members against which said block is seated, a pair of jaws pivoted to the block and spaced apart to receive the saw between them, said jaws being formed into clamp members at one end which clamp the saw on the opposite sides and means operating between the other ends of said jaws and causing said clamps to engage with the saw, said means further operating to overcome said yieldable members and force the said block forwardly imparting a partial rotation to the saw.

19. In a device of the character described, a chisel-like gummer, a bearing in which said gummer is mounted and in which it is movable lengthwise, a pair of yieldable seats resisting against the movement of the chisel in either direction.

In testimony whereof I have signed my name to this specification in the presence of two subscribing witnesses.

JAMES E. NORMAN.

Witnesses:
ISRAEL DUEBEN,
F. B. STOREY.

Copies of this patent may be obtained for five cents each, by addressing the "Commissioner of Patents, Washington, D. C."